United States Patent
Momose

(10) Patent No.: US 8,612,685 B2
(45) Date of Patent: Dec. 17, 2013

(54) PROCESSOR, INFORMATION PROCESSING DEVICE AND CACHE CONTROL METHOD OF PROCESSOR

(75) Inventor: Shintaro Momose, Tokyo (JP)

(73) Assignee: NEC Corporation, Tokyo (JP)

( * ) Notice: Subject to any disclaimer, the term of this patent is extended or adjusted under 35 U.S.C. 154(b) by 816 days.

(21) Appl. No.: 12/285,717

(22) Filed: Oct. 14, 2008

(65) Prior Publication Data

US 2009/0100232 A1    Apr. 16, 2009

(30) Foreign Application Priority Data

Oct. 11, 2007    (JP) .................. 2007-265739

(51) Int. Cl.
- G06F 12/00    (2006.01)
- G06F 13/00    (2006.01)
- G06F 13/28    (2006.01)

(52) U.S. Cl.
USPC .......................................... 711/118; 711/138

(58) Field of Classification Search
USPC .................................. 711/138, 118
See application file for complete search history.

(56) References Cited

U.S. PATENT DOCUMENTS

| | | | | |
|---|---|---|---|---|
| 4,156,906 A | * | 5/1979 | Ryan ............................. | 711/128 |
| 5,247,639 A | * | 9/1993 | Yamahata ...................... | 711/138 |
| 5,745,728 A | | 4/1998 | Genduso et al. | |
| 5,790,137 A | * | 8/1998 | Derby et al. .................. | 345/557 |
| 5,822,760 A | * | 10/1998 | Yoshizawa et al. ........... | 711/137 |
| 2001/0032298 A1 | * | 10/2001 | Emons .......................... | 711/138 |
| 2006/0015685 A1 | | 1/2006 | Daito | |

FOREIGN PATENT DOCUMENTS

| | | |
|---|---|---|
| JP | 57-30170 | 2/1982 |
| JP | 62-42247 | 2/1987 |
| JP | 62-197842 | 9/1987 |
| JP | 2-50238 | 2/1990 |
| JP | 6-202951 | 7/1994 |
| JP | 9-179782 | 7/1997 |
| JP | 11-134254 | 5/1999 |
| JP | 2000-194602 | 7/2000 |
| JP | 2003-196085 | 7/2003 |
| JP | 2006-31386 | 2/2006 |

OTHER PUBLICATIONS

Intel Corporation, "Pentium Family Developer's Manual Part II", pp. 18-1 through 18-8, Intel Japan Corporation, 1995.
Japanese Office Action dated Oct. 7, 2009 and partial English translation thereof.

* cited by examiner

Primary Examiner — Sheng-Jen Tsai
(74) Attorney, Agent, or Firm — McGinn Intellectual Property Law Group, PLLC

(57) ABSTRACT

A processor having a cache memory provided therein controls use of the cache memory based on operation mode information which changeably designates use/no-use of a cache memory and on designation of cache memory use in an access instruction word in a program at the time of an access to a main storage memory from the program in operation.

19 Claims, 8 Drawing Sheets

PROCESSOR, INFORMATION PROCESSING DEVICE AND CACHE CONTROL METHOD OF PROCESSOR

TECHNICAL FIELD

The present invention relates to a processor containing a cache memory and a cache control method of the processor and, more particularly, a processor, an information processing device and a cache control method which realize high efficiency in cache use.

BACKGROUND ART

General-purpose scalar processors in general adopt a cache mechanism realized by hardware control. In cache control mechanism realized by hardware, data to be loaded from a memory by a processor or data to be stored in a memory is stored in a cache.

Since cache control intends to speed up memory access by holding data whose reusability is high in a cache memory, crucial is how data whose reusability is high is held in a cache.

A cache mechanism realized by hardware control in general adopts a control system of storing data whose reusability is high in a cache memory by using an LRU (Least Recently Used) system or the like.

In a cache control system using the LRU system or the like, however, data whose reusability is high will not be always held in a cache, so that use efficiency of a cache can not be increased satisfactorily.

For solving such a problem, several methods are proposed of storing data into a cache memory by software control, one example of which is disclosed in Patent Literature 1 or Patent Literature 2.

The cache memory system recited in Patent Literature 1 enables data whose reusability is high to be stored in a cache memory by controlling use of a cache memory based on a kind of access instruction to a main memory.

Cache control system realized by software enables only data whose reusability is high to be stored in a cache as compared with control by hardware using LRU or the like.

Patent Literature 1: Japanese Patent Laying-Open No. 6-202951.

The existing cache control systems realized by software which are proposed in Patent Literature 1 and the like have a problem that cache control can not be dynamically changed during program operation, so that cache use efficiency can not be increased satisfactorily.

The reason is that since the control system is cache control based on designation by an access instruction, data to be stored in a cache is determined at the time of compiling a program, so that cache storage control of data can not be dynamically controlled.

THE OBJECT OF THE INVENTION

An object of the present invention is to provide a processor, an information processing device and a cache control method of a processor which solve the above-described problem that cache control can not be dynamically changed during program operation and therefore cache use efficiency can not be increased satisfactorily.

SUMMARY

According to a first exemplary aspect of the invention, a processor which includes a cache memory, wherein said processor controls use of said cache memory at the time of an access to a main storage memory from a program in operation by referring to an operation mode of designating use/no-use of said cache memory.

According to a second exemplary aspect of the invention, a cache control method for controlling use of a cache memory provided in a processor, comprising the step of controlling use of said cache memory at the time of an access to a main storage memory from a program in operation by referring to an operation mode which designates use/no-use of said cache memory.

According to a third exemplary aspect of the invention, an information processing device, includes a processor having a cache memory, wherein said processor controls use of said cache memory at the time of an access to a main storage memory from a program in operation by referring to an operation mode which designates use/no-use of said cache memory.

According to the present invention, efficiency in cache use can be increased effectively.

EXEMPLARY EMBODIMENT

Next, an exemplary embodiment of the present invention will be described in detail with reference to the drawings.
(First Exemplary Embodiment)

Figure 1:
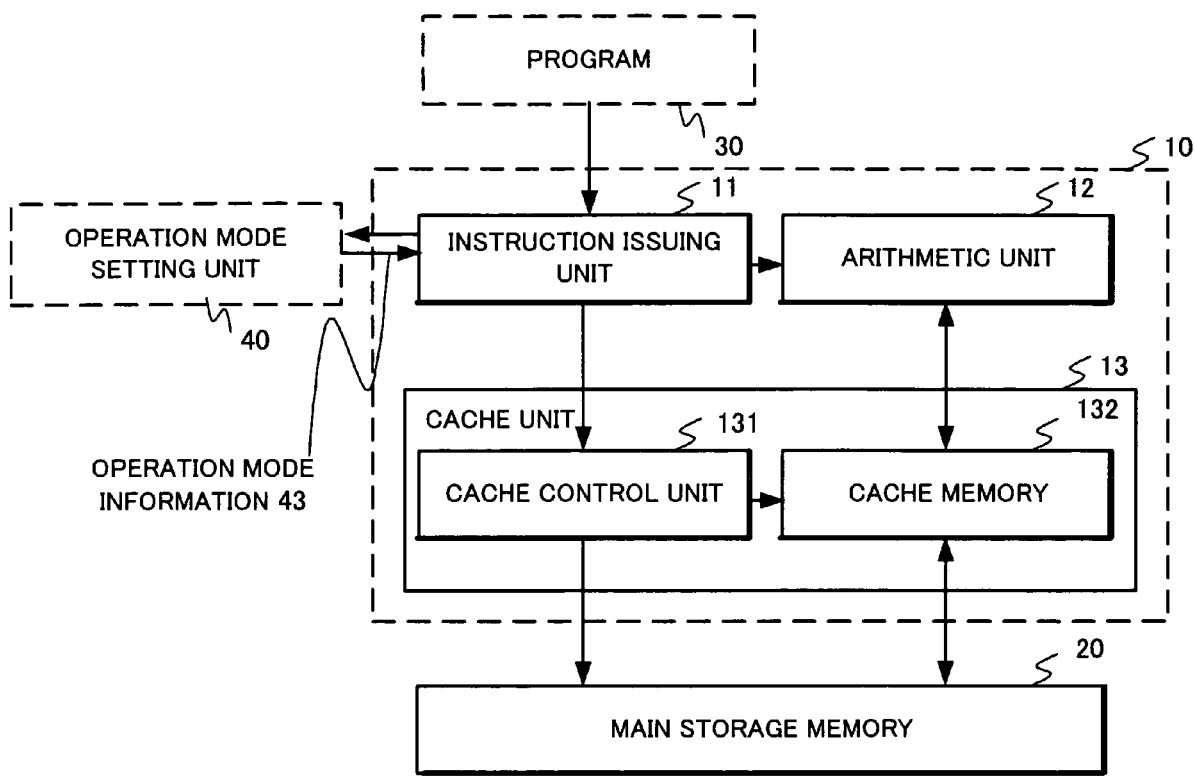
FIG. 1 is a block diagram showing a structure of a processor according to a first exemplary embodiment of the present invention.

FIG. 1 is a block diagram showing a structure of a processor (central processing unit) 10 according to a first exemplary embodiment of the present invention.

The processor 10 according to the first exemplary embodiment is designed to comprise an instruction issuing unit 11, an arithmetic unit 12 and a cache unit 13 and be connected to a main storage memory 20 through the cache unit 13. In addition, to the instruction issuing unit 11, a program 30 and an operation mode setting unit 40 are connected.

Upon receiving an instruction word of the program 30, the instruction issuing unit 11 issues an arithmetic instruction or an access instruction to the arithmetic unit 12 or a cache control unit 131 according to the instruction word. At the time of issuing an access instruction to the main storage memory 20, for example, the unit issues an access instruction with cache use or without cache use to the cache unit 13 based on cache use designation in an access instruction word of the program 30 or operation mode information at the operation mode setting unit 40.

Based on an arithmetic instruction issued from the instruction issuing unit 11, the arithmetic unit 12 executes arithmetic processing with respect to data or the like loaded from the main storage memory 20 under the control of the cache control unit 131.

The cache unit 13 comprises the cache control unit 131 and a cache memory 132.

The cache control unit 131 executes control of an access to the cache memory 132 and the main storage memory 20 based on an access instruction to the main storage memory 20 from the instruction issuing unit 11.

For the cache memory 132 and the main storage memory 20 as a storage device, devices of a common storage system widely known to those skilled in the art can be used. No description will be made of the details of the structures of the same.

The cache memory 13 can be also formed by arranging caches in layers such as a primary cache memory and a secondary cache memory between the arithmetic unit 12 and the main storage memory 20 as is well known to those skilled in the art.

Possible control of a plurality of cache memories in the respective layers in the present exemplary embodiment are a method of controlling each cache memory individually or a method of controlling a plurality of cache memories in the lump.

The program 30 are formed of execution codes compiled based on parsing by a compiler or on an instruction line for cache use which is explicitly described in a program source code by a user.

Designated in an access instruction word in the program 30 to the main storage memory 20 is to use or not to use the cache memory 132 at the time of accessing the main storage memory 20.

By cache use designation by the access instruction word, designated to the instruction issuing unit 11 is to control cache use or not to control cache use at the time of accessing the main storage memory 20.

Upon receiving an access instruction word in the program 30, the instruction issuing unit 11 issues an access instruction to the cache control unit 131 based on operation mode information of the operation mode setting unit 40 and cache use designation made by the access instruction word.

While a related art instruction issuing unit which has been described in the Background Art issues an access instruction with cache use or without cache use according to only the designation whether a cache is to be used or not in an access instruction word in the program 30, the instruction issuing unit 11 according to the present exemplary embodiment issues an access instruction with cache use or without cache use based on both operation mode information of the operation mode setting unit 40 and cache use designation in an access instruction word of the program 30.

Figure 2:
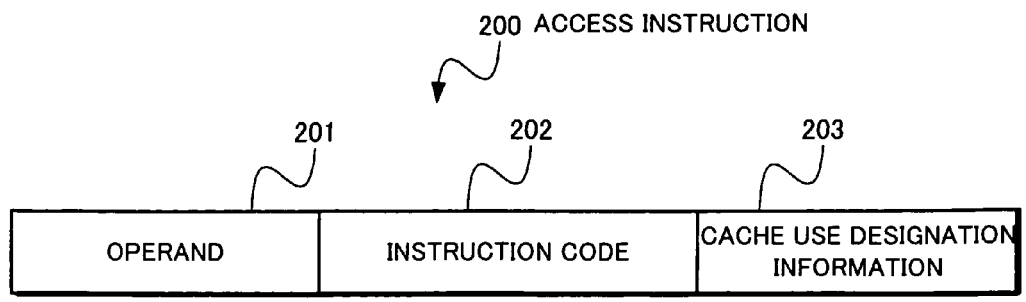
FIG. 2 is a diagram showing an example of a structure of an access instruction issued by an instruction issuing unit of the processor according to the first exemplary embodiment of the present invention.

Here, an example of a structure of an access instruction 200 issued by the instruction issuing unit 11 is shown in FIG. 2.

As shown in FIG. 2, the access instruction 200 issued by the instruction issuing unit 11 includes, in addition to an operand 201 for designating an access destination address of the main storage memory 20 and an instruction code 202 for designating access operation (loading or storing), cache use designation information 203.

Based on a value of the cache use designation information 203 (e.g. bit 1 or 0) of the access instruction 200, designation is made to the cache control unit 131 about execution of cache use control or no execution of cache use control at the time of accessing the main storage memory 20.

Set at the operation mode setting unit 40 is operation mode information 43 which designates, to the instruction issuing unit 11, an operation mode of using the cache memory 132 or an operation mode of not using the cache memory 132 for an access to the main storage memory 20.

At the time of issuing an access instruction to the main storage memory 20, the instruction issuing unit 11 refers to the operation mode information 43 set at the operation mode setting unit 40 and when the operation mode information 43 indicates cache use, issues an access instruction with cache use intended to use the cache memory 132 and when the operation mode information 43 indicates no cache use, issues an access instruction without cache use.

In the present exemplary embodiment, the operation mode information 43 designated by the operation mode setting unit 40 can be dynamically changed during execution of the program 30 (i.e. during operation of the processor 10).

At the instruction issuing unit 11, the operation mode information 43 of the operation mode setting unit 40 is referred to preferentially over the cache use designation information 203 in the access instruction word 200. Thus, by changing the operation mode information 43 of the operation mode setting unit 40 during execution of a program, cache use/no cache use can be dynamically changed during execution of the program.

Figure 3:
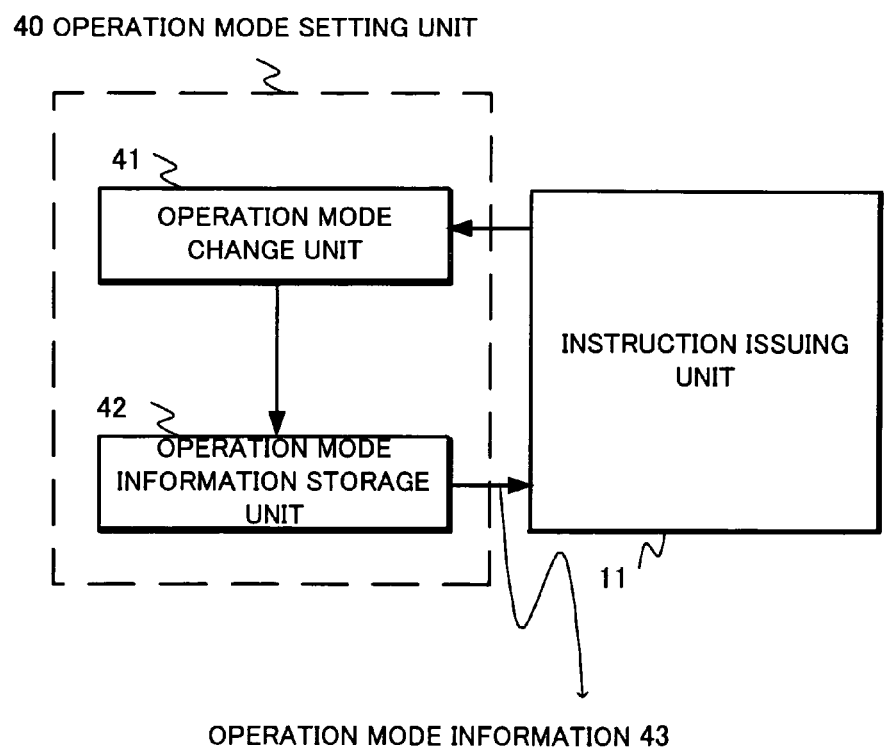
FIG. 3 is a block diagram showing an example of a structure of an operation mode setting unit of the processor according to the first exemplary embodiment of the present invention.

An example of a structure of the operation mode setting unit 40 will be described with reference to FIG. 3.

The operation mode setting unit 40 comprises an operation mode change unit 41 for changing the operation mode information 43 and an operation mode information storage unit 42 for storing the operation mode information 43.

The operation mode change unit 41 has a function of storing, upon receiving an instruction to change an operation mode which is issued from the instruction issuing unit 11, an operation mode designated by the instruction to the operation mode information storage unit 42 as the operation mode designation information 43.

The operation mode information storage unit 42 can be realized, for example, by using a software register, a hardware register or the like.

By describing an instruction line for changing the operation mode information 43 indicative of cache use/no cache use in the program 30 according to a fixed condition such as branch, change of the operation mode information 43 is executed by the operation mode change unit 41 in a manner as described above. Thus setting an operation mode based on an instruction from the program 30 enables the operation mode to be changed dynamically according to an operation condition even when the program 30 is being executed.

It is also possible to design the processor to change the operation mode information 43 by instructing the operation mode change unit 41 to change an operation mode from an OS (Operating System) which manages operation environments of the processor 10 or the like.

Thus structured operation mode setting unit 40 can be realized by either of hardware and software.

Figure 4:
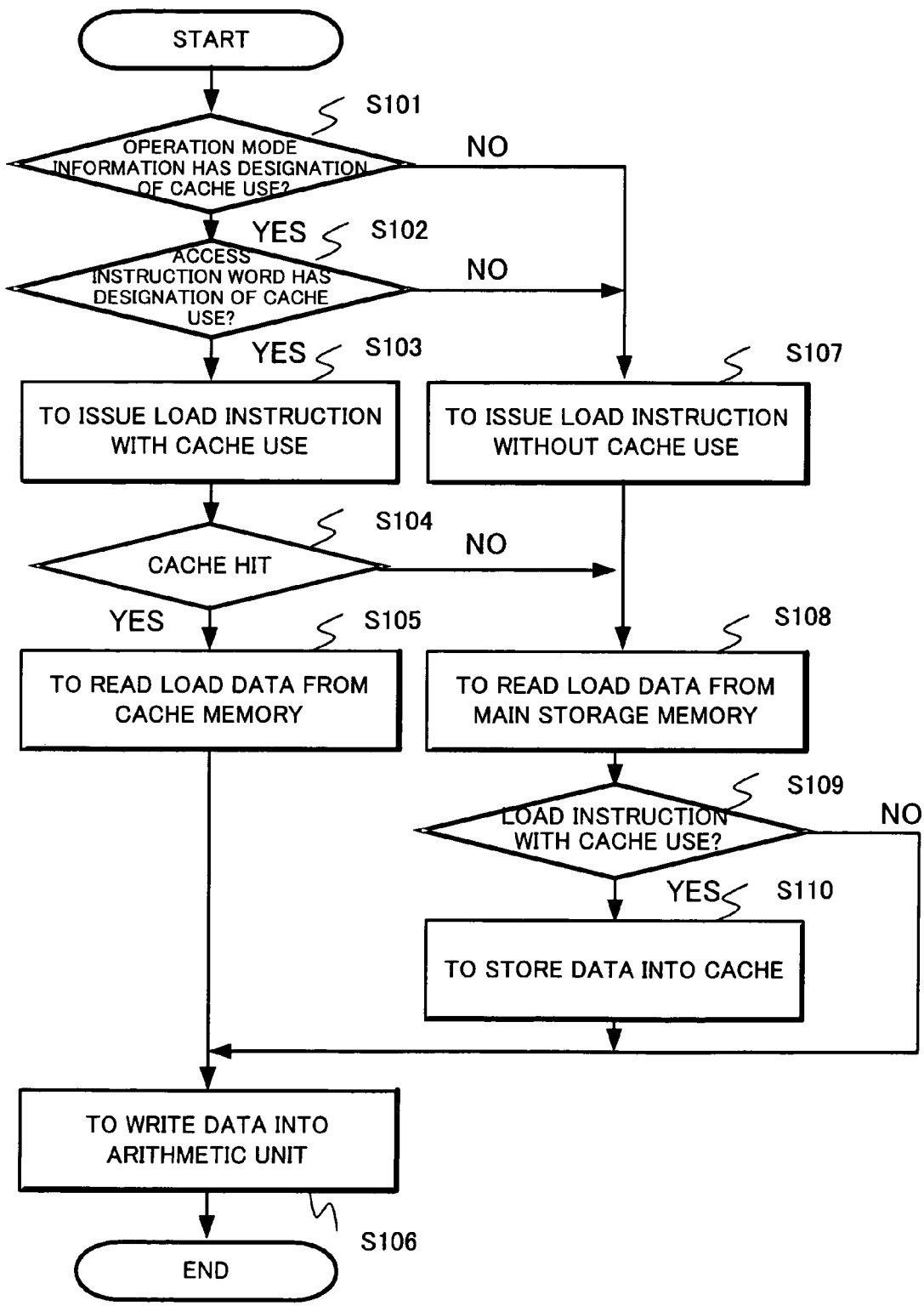
FIG. 4 is a flow chart for use in explaining loading operation in main storage access according to the first exemplary embodiment of the present invention.

Next, description will be made of operation of the processor 10 to access the main storage memory 20 according to the first exemplary embodiment with reference to the flow charts shown in FIG. 4 and FIG. 5.

First, description will be made of loading operation in main storage access with reference to the flow chart shown in FIG. 4.

When a load instruction is given to the instruction issuing unit 11 as an access instruction to the main storage memory 20 from the program 30, the instruction issuing unit 11 refers to the operation mode information 43 of the operation mode setting unit 40 to determine whether the information designates cache use or no cache use (Step S101).

When cache use is designated in the operation mode information 43, the instruction issuing unit 11 further determines whether cache use is designated in an instruction word of the load instruction from the program 30 (Step S102).

When cache use is designated in the instruction word of the program 30, the instruction issuing unit 11 issues a load instruction with cache use to the cache control unit 131 (Step S103).

Based on the load instruction with cache use which is issued by the instruction issuing unit 11, the cache control unit 131 determines whether there exists in the cache memory 132 load data designated by the load instruction with cache use (i.e. existence/non-existence of cache hit) (Step S104).

When there exists the relevant load data in the cache 132 (in a case of cache hit), the cache control unit 131 loads the load data in the cache 132 into the arithmetic unit 12 (Steps S105 and S106).

When there fails to exist the relevant load data in the cache 132 (in a case of cache miss), the cache control unit 131 reads the load data from the main storage memory 20 (Step S108).

When the issued load instruction is a load instruction with cache use (Step S109), store the relevant load data read from the main storage memory 20 into the cache memory 132 by the control of the cache control unit 131 (Step S110), and then load the relevant load data into the arithmetic unit 12 (Step S106).

When either the cache use designation by the operation mode information 43 or the cache use designation in the instruction word of the program 30 is to use no cache, the instruction issuing unit 11 issues a load instruction without cache use (Step S107).

The load instruction without cache use which is issued by the instruction issuing unit 11 is to read load data designated by the relevant load instruction from the main storage memory 20 through the cache control unit 131 (Step S108). Since the issued load instruction is a load instruction without cache use (Step S109), load the read load data into the arithmetic unit 12 without storage into the cache memory 132 (Step S106).

Next, description will be made of storing operation of the processor 10 in main storage access according to the first exemplary embodiment with reference to the flow chart shown in FIG. 5.

When a store instruction is given by the program 30 to the instruction issuing unit 11 as an access instruction to the main storage memory 20, the instruction issuing unit 11 refers to the operation mode information 43 of the operation mode setting unit 40 to determine whether the information indicates cache use or no cache use (Step S201).

When cache use is designated in the operation mode information 43, the instruction issuing unit 11 further determines whether cache use is designated in an instruction word of the store instruction from the program 30 (Step S202).

When cache use is designated in the instruction word of the program 30, the instruction issuing unit 11 issues a store instruction with cache use to the cache control unit 131 (Step S203).

Based on the store instruction with cache use which is issued by the instruction issuing unit 11, the cache control unit 131 determines whether there exists in the cache memory 132 store data designated by the store instruction (i.e. existence/non-existence of cache hit) (Step S204).

When there exists the store data in the cache memory 132 (in a case of cache hit), by storing the data from the arithmetic unit 12 into the cache memory 132, the data in the cache memory 132 is updated (Step S205). Simultaneously, the relevant store data is written into the main storage memory 20 (Step S206).

When either the cache use designation by the operation mode information 43 or the cache use designation in the instruction word in the program 30 is to use no cache, the instruction issuing unit 11 issues a store instruction without cache use (Step S207).

In response to the relevant store instruction without cache use issued by the instruction issuing unit 11, write the relevant store data into the main storage memory 20 through the cache control unit 131 (Step S206).

(Effects of First Exemplary Embodiment)

Next, the effect of the first exemplary embodiment will be described.

Since the processor 10 according to the first exemplary embodiment is designed to issue an access instruction with cache use or without cache use from the instruction issuing unit 11 based on the operation mode information 43 of the operation mode setting unit 40, cache use can be dynamically controlled even during operation of the program 30.

In addition, since cache use is controlled based on the operation mode information 43 which can be changed dynamically and cache use designation in an access instruction word of the program 30, high efficiency in cache use can be realized with cache pollution decreased which is caused by storage of data whose reusability is low into the cache memory 132.

Controlling cache use by using the operation mode information 43 of the operation mode setting unit 40 enables cache use to be dynamically controlled even after compilation of the program 30 and optimization of cache use of the program 30 to be realized with ease.

(Second Exemplary Embodiment)

Next, a second exemplary embodiment of the present invention will be described.

Since a structure of the processor 10 according to the second exemplary embodiment is the same as that of the first exemplary embodiment shown in FIG. 1, no description will be made thereof.

The second exemplary embodiment differs from the first exemplary embodiment in that even when the instruction issuing unit 11 issues an access instruction without cache use, the cache control unit 131 determines whether there exists in the cache memory 132 data to be accessed.

More specifically, in the second exemplary embodiment, the cache control unit 131 executes control of loading, at the time of loading in response to a load instruction without cache use, relevant load data from the cache memory 132 when it exists in the cache memory 132 and updating, at the time of storing in response to a store instruction without cache use, data of the cache memory 20 when store data exists in the cache memory 132.

Figure 6:
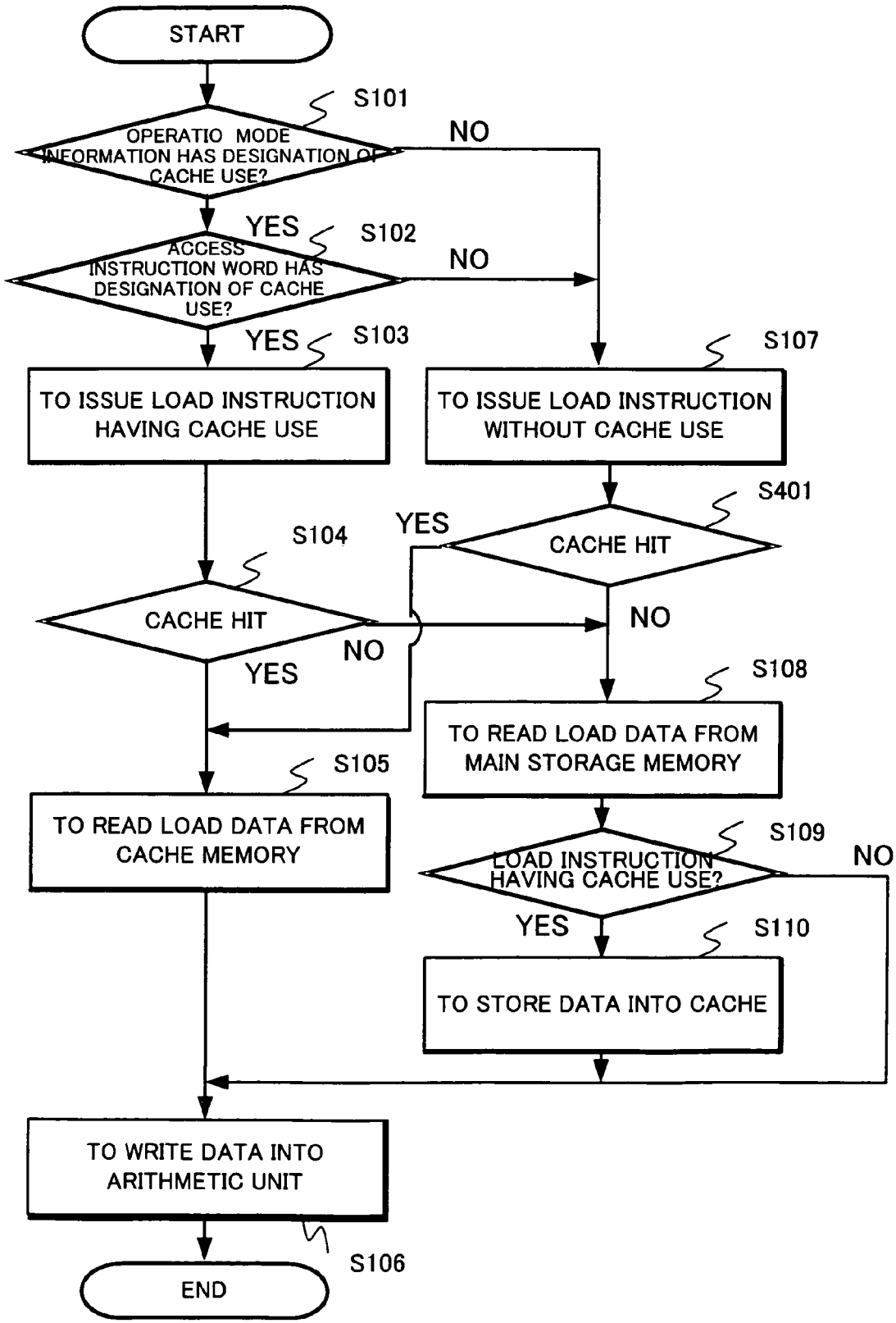
FIG. 6 is a flow chart for use in explaining loading operation in main storage access according to a second exemplary embodiment of the present invention.

First, description will be made of loading operation in main storage access according to the second exemplary embodiment with reference to the flow chart shown in FIG. 6. In FIG. 6, steps given the common reference numerals to those in FIG. 4 have the same processing contents, whose detailed description will be omitted.

In the first exemplary embodiment, the instruction issuing unit 11 executes control of issuing a load instruction without cache use (Step S107) and reading load data designated by the load instruction from the main storage memory 20 (Step S108) when either designation of cache use/no use by the operation mode information 43 or designation of cache use/no use in an instruction word in the program 30 is to use no cache.

On the other hand, in the second exemplary embodiment, when a load instruction without cache use is issued (Step S107), the cache control unit 131 determines whether there exists load data in the cache memory 132 (Step S401) and when there exists load data, the processing proceeds to Step S105.

When there exists no load data in the cache memory 132, read load data designated by the load instruction from the main storage memory 20.

Next, storing operation in main storage access according to the second exemplary embodiment will be described with reference to the flow chart shown in FIG. 7.

Figure 5:
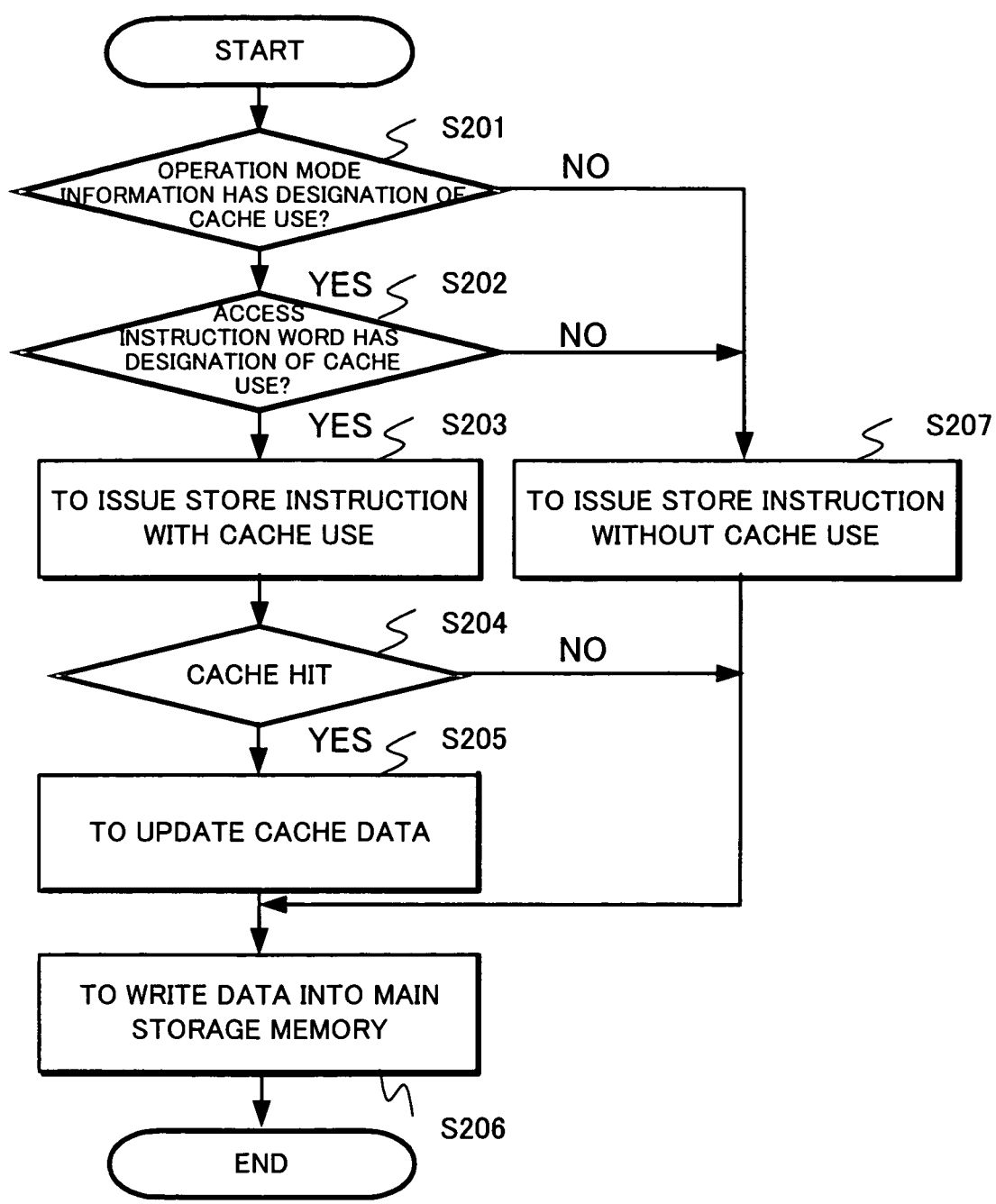
FIG. 5 is a flow chart for use in explaining storing operation in main storage access according to the first exemplary embodiment of the present invention.
Figure 7:
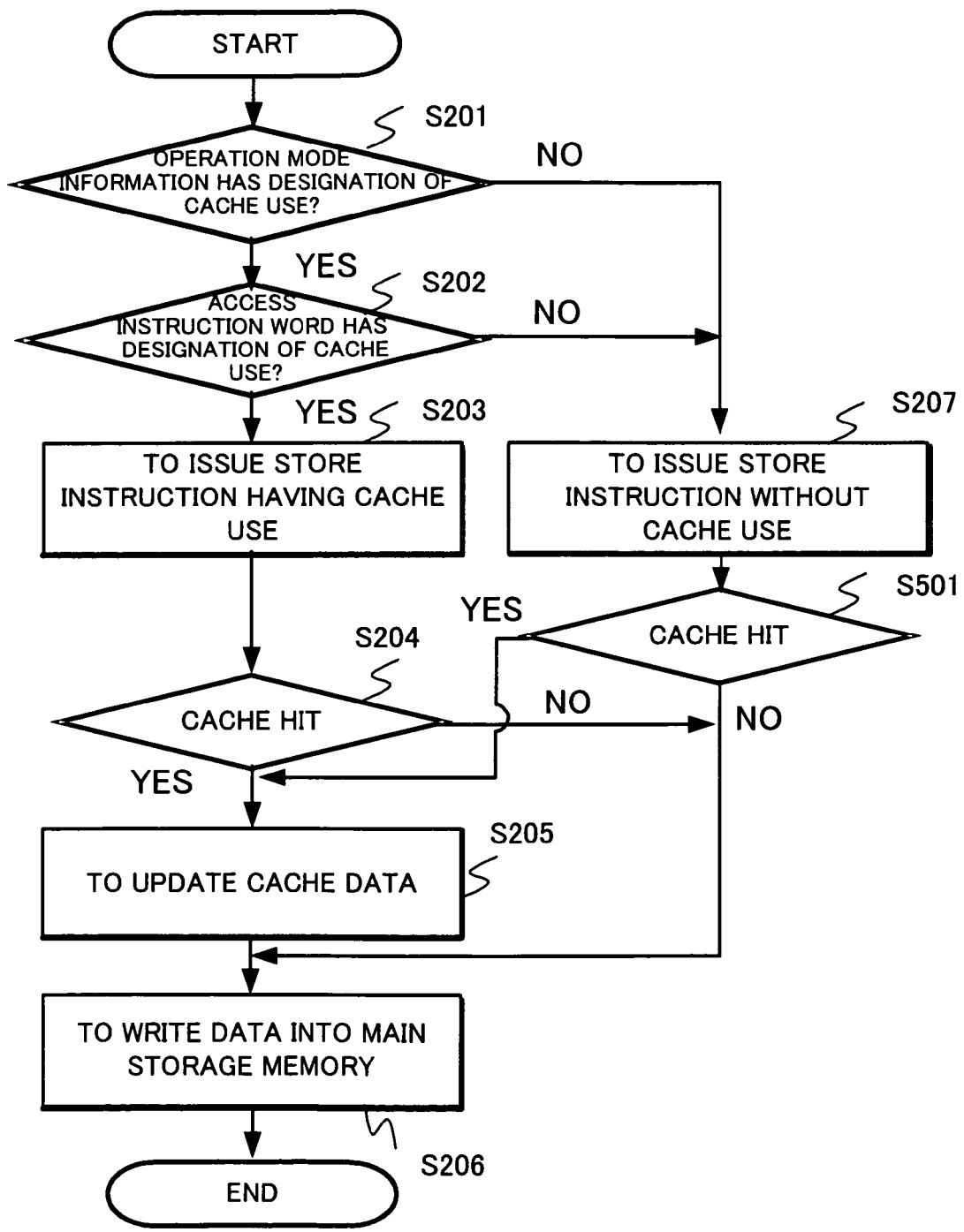
FIG. 7 is a flow chart for use in explaining storing operation in main storage access according to the second exemplary embodiment of the present invention.

In FIG. 7, steps given the common reference numerals to those in FIG. 5 have the same processing contents, whose detailed description will be omitted.

In the first exemplary embodiment, when either designation of cache use/no use by the operation mode information 43 or designation of cache use/no use in an instruction word in the program 30 is to use no cache, such control is executed of issuing a store instruction without cache use by the instruction issuing unit 11 (Step S207) to write relevant store data in the main storage memory 20 (Step S206).

On the other hand, in the second exemplary embodiment, when a load instruction without cache use is issued (Step S207), the cache control unit 131 determines whether there exists store data in the cache memory 132 (Step S501) and when there exists store data, the processing proceeds to Step S205.

When there exists no store data in the cache memory 132, write the relevant store data in the main storage memory 20 in response to a store instruction without cache use (Step S206).

(Effects of Second Exemplary Embodiment)

Next, effects of the second exemplary embodiment will be described.

In addition to the same effects as those described above of the first exemplary embodiment, the second exemplary embodiment enables efficiency in cache use to be increased more because of execution of control of determining whether data to be accessed exists in the cache memory 132 even in a case of an access instruction without cache use.

(Third Exemplary Embodiment)

Next, a third exemplary embodiment of the present invention will be described.

Since a structure of the processor 10 according to the third exemplary embodiment is the same as that of the first exemplary embodiment shown in FIG. 1, no description will be made thereof.

The third exemplary embodiment is the same as the first exemplary embodiment in that the instruction issuing unit 11 refers to the operation mode information 43 of the operation mode setting unit 40 to determine whether to use a cache or not but differs from the first exemplary embodiment in that no determination is made of cache use designation in an instruction word of an access instruction from the program 30.

More specifically, in the third exemplary embodiment, control is executed of, when referring to the operation mode information 43 of the operation mode setting unit 40 to find that the information designates cache use, issuing an access instruction with cache use to the cache control unit 131 by the instruction issuing unit 11 without making determination of designation of cache use in an instruction word of an access instruction.

Figure 8:
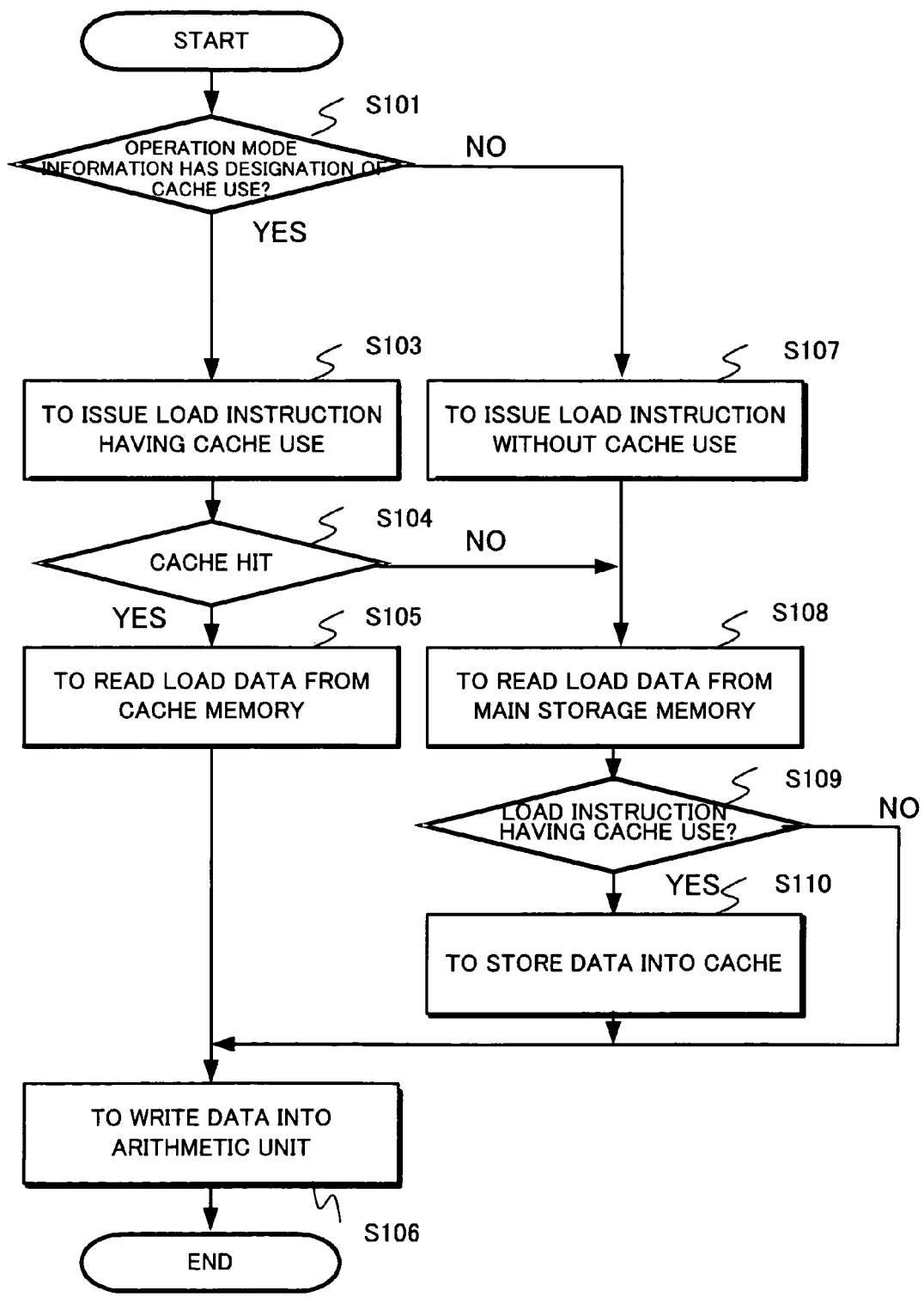
FIG. 8 is a flow chart for use in explaining loading operation in main storage access according to a third exemplary embodiment of the present invention.

In the following, description will be made of loading operation in main storage access according to the third exemplary embodiment with reference to the flow chart shown in FIG. 8. In FIG. 8, steps given the common reference numerals to those in FIG. 4 have the same processing contents, whose detailed description will be omitted.

In the first exemplary embodiment, the instruction issuing unit 11 issues a load instruction with cache use (Step S103) when designation of cache use by the operation mode information 43 is to use a cache (Step S101) and cache use designation in an instruction word in the program 30 is to use a cache (Step S102).

On the other hand, in the third exemplary embodiment, when designation of cache use by the operation mode information 43 is to use a cache (Step S101), the instruction issuing unit 11 issues a load instruction with cache use without making determination of designation of cache use in an instruction word of a load instruction from the program 30 (Step S103).

Operation to be executed after a load instruction with cache use is issued and operation to be executed after a load instruction without cache use is issued are the same as those of the first exemplary embodiment.

Next, storing operation in main storage access according to the third exemplary embodiment will be described with reference to the flow chart shown in FIG. 9.

Figure 9:
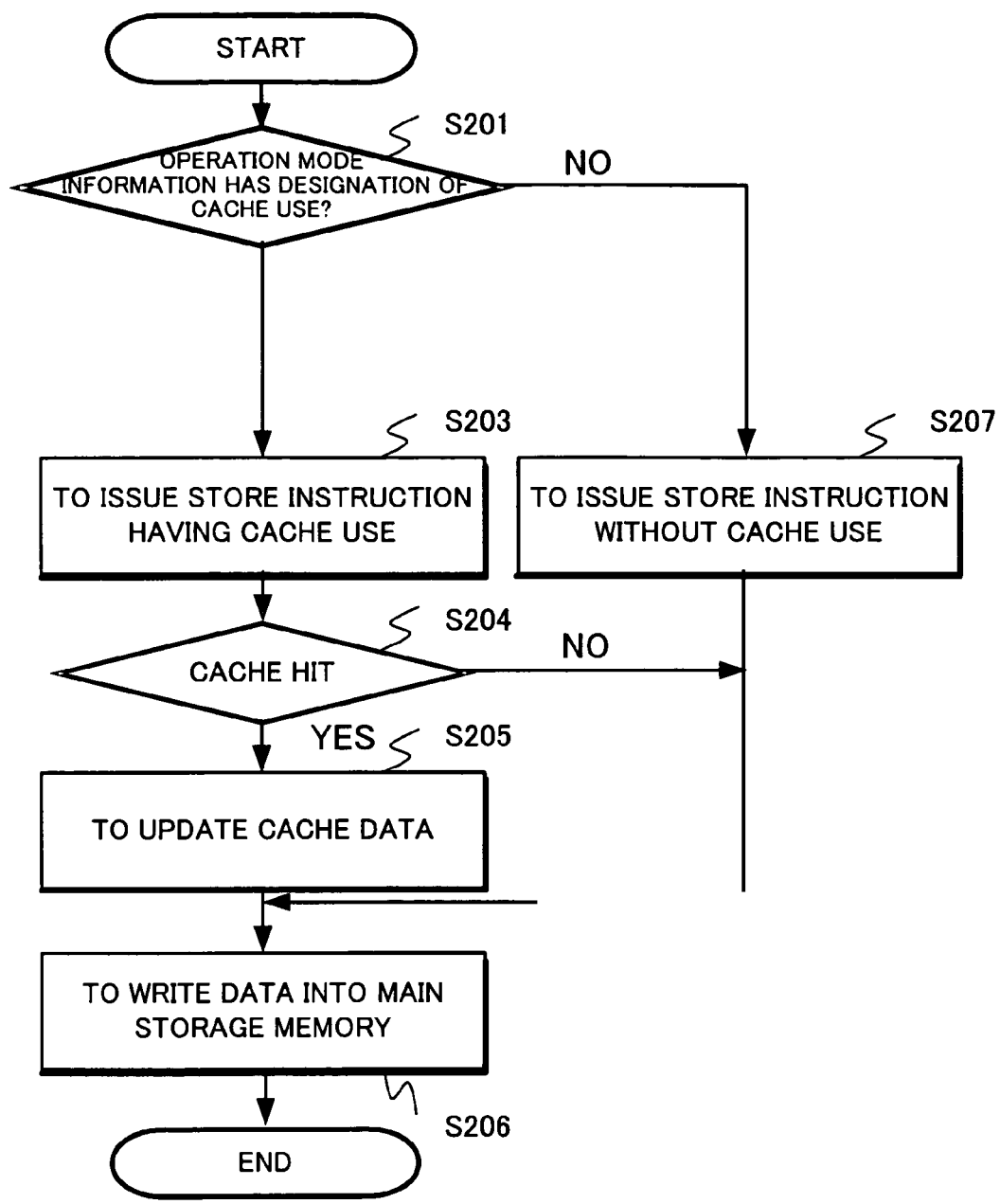
FIG. 9 is a flow chart for use in explaining storing operation in main storage access according to the third exemplary embodiment of the present invention.

Also in FIG. 9, steps given the common reference numerals to those in FIG. 5 have the same processing contents, whose detailed description will be omitted.

In the first exemplary embodiment, when cache use designation by the operation mode information 43 is to use a cache (Step S201) and cache use designation in an instruction word in the program 30 is to use a cache (Step S202), the instruction issuing unit 11 issues a store instruction with cache use (Step S203).

On the other hand, in the third exemplary embodiment, when designation of cache use by the operation mode information 43 is to use a cache (Step S201), the instruction issuing unit 11 issues a store instruction with cache use without determining whether cache use or no cache use is designated in an instruction word of a store instruction from the program 30 (Step S203).

Operation to be executed after a store instruction with cache use is issued and operation to be executed after a store instruction without cache use is issued are the same as those of the first exemplary embodiment.

(Effects of Third Exemplary Embodiment)

Similarly to the first exemplary embodiment, the processor according to the third exemplary embodiment attains the following effects.

Since the processor is designed to issue an access instruction with cache use or without cache use based on the operation mode information 43, cache use can be dynamically controlled even during operation of the program 30.

In addition, since cache use is controlled by using the operation mode information 43, cache use can be dynamically controlled even after the program 30 is compiled, thereby realizing optimization of cache use of the program 30 with ease.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, possible as other exemplary embodiment is, which is the same as the above-described first exemplary embodiment in the basic structure, a combination with cache memory write back control or write through control.

While in each of the above-described exemplary embodiments, the description has been made of the processor to which the present invention is applied, it is apparent that the present invention can be also applied to an information processing device mounted with a processor.

Structure with the above-described second exemplary embodiment and third exemplary embodiment combined is also possible.

INCORPORATION BY REFERENCE

This application is based upon and claims the benefit of priority from Japanese patent application No. 2007-265739, filed on Oct. 11, 2007, the disclosure of which is incorporated herein in its entirety by reference.

The invention claimed is:

1. A processor, comprising:
a cache memory;
an instruction issuing unit for issuing an access instruction to a main storage memory based on an access instruction word in a program referring to said main storage memory;
a cache control unit that controls a use of said cache memory at a time of an access to the main storage memory from the program during operation by referring to an operation mode of designating use/no-use of said cache memory and a designation of said use of said cache memory in an access instruction issued by said instruction issuing unit; and
an operation mode setting unit for changeably setting operation mode information indicative of said operation mode,
wherein said operation mode setting unit comprises:
a storage unit for storing said operation mode information; and an operation mode change unit for dynamically changing said operation mode information based on an instruction in said program during operation,
wherein said instruction issuing unit issues to said cache control unit an access instruction with cache use for using said cache memory or an access instruction without cache use for not using said cache memory, based on said operation mode and a designation of cache use in said access instruction word,
wherein said cache control unit controls said use of said cache memory according to said access instruction from said instruction issuing unit,
wherein said instruction issuing unit, when said operation mode designates use of a cache and said access instruction word designates a use of a cache, issues to said cache control unit said access instruction with cache use, and
wherein said instruction issuing unit, when said operation mode designates use of a cache and said access instruction word designates no use of a cache, issues to said cache control unit said access instruction without cache use.

2. The processor according to claim 1, wherein said instruction issuing unit, when said operation mode designates no cache use, even if said access instruction word designates use of a cache, issues said access instruction without cache use.

3. The processor according to claim 1, wherein said cache control unit determines whether data to be accessed exists or not in said cache memory even when an access instruction from said instruction issuing unit comprises said access instruction without cache use, and when there exists data to be accessed, executes access control using said cache memory.

4. A cache control method for controlling use of a cache memory provided in a processor, said method comprising:
controlling use of said cache memory at a time of an access to a main storage memory from a program in operation by referring to an operation mode which designates use/no-use of said cache memory and designation of said use of said cache memory in an access instruction word of said program,
wherein operation mode information indicative of said operation mode is dynamically changed by an instruction in said program in operation; and
issuing, to a cache control unit which controls said use of said cache memory according to an access instruction, an access instruction with cache use for using said cache memory or an access instruction without cache use for not using said cache memory based on said operation mode and designation of cache use in said access instruction word in said program contained within the access to said main storage memory,
when said operation mode designates use of a cache and said access instruction word designates use of a cache, issuing to said cache control unit said access instruction with cache use, and
when said operation mode designates use of a cache and said access instruction word designates no use of a cache, issuing to said cache control unit said access instruction without cache use.

5. The cache control method according to claim 4, further comprising:
when said operation mode designates no cache use, even if said access instruction word designates use of a cache, issuing said access instruction without cache use.

6. The cache control method according to claim 4, wherein determination is made whether data to be accessed exists or not in said cache memory even when an access instruction from said instruction issuing unit comprises said access instruction without cache use, and when there exists data to be accessed, access control is executed using said cache memory.

7. An information processing device, comprising:
a processor comprising a cache memory,
wherein said processor comprises:
an instruction issuing unit for issuing an access instruction to a main storage memory based on an access instruction word in a program referring to said main storage memory; and
a cache control unit that controls a use of said cache memory at a time of an access to the main storage memory from said program during operation by referring to an operation mode which designates use/no-use of said cache memory and designation of said use of said cache memory in an access instruction issued by said instruction issuing unit, wherein said processor includes an operation mode setting unit for changeably setting operation mode information indicative of said operation mode, wherein said operation mode setting unit comprises:
a storage unit for storing said operation mode information, and
an operation mode change unit for dynamically changing said operation mode information, based on an instruction in said program during operation, wherein said instruction issuing unit issues to said cache control unit an access instruction with cache use for using said cache memory or an access instruction without cache use for not using said cache memory~based on said operation mode and a designation of cache use in said access instruction word, wherein said cache control unit controls said use of said cache memory according to said access instruction from said instruction issuing unit, wherein said instruction issuing unit, when said operation mode designates use of a cache and said access instruction word designates a use of a cache, issues to said cache control unit said access instruction with cache use, and wherein said instruction issuing unit, when said operation mode designates use of a cache and said access instruction word designates no use of a cache, issues to said cache control unit said access instruction without cache use.

8. The information processing device according to claim 7, wherein said instruction issuing unit, when said operation mode designates no cache use, even if said access instruction word designates use of a cache, issues said access instruction without cache use.

9. The information processing device according to claim 7, wherein said cache control unit determines whether data to be accessed exists or not in said cache memory even when an access instruction from said instruction issuing unit comprises said access instruction without cache use, and when there exists data to be accessed, executes access control using said cache memory.

10. The processor according to claim 1, wherein the instruction issuing unit issues the access instruction to said main storage memory based on said designation of said use of said cache memory in said access instruction word in said program.

11. The processor according to claim 1, wherein the instruction issuing unit issues the access instruction to said main storage memory based on the operation mode information of said operation mode setting unit and said designation of said use of said cache memory in said access instruction word.

12. The processor according to claim 1, wherein the instruction issuing unit issues the access instruction to said main storage memory by referring to the operation mode information set at the operation mode setting unit.

13. The processor according to claim 1, wherein said operation mode change unit stores, upon receiving the instruction in the program to change an operation mode, the operation mode designated to the storage unit as said operation mode information.

14. The processor according to claim 1, wherein the cache use is dynamically controlled during said program during operation.

15. The processor according to claim 1, wherein the cache use is controlled based on the operation mode information which is changed dynamically.

16. The cache control method according to claim 4, wherein the cache use is dynamically controlled during said program in operation.

17. The cache control method according to claim 4, wherein the cache use is controlled based on the operation mode information which is changed dynamically.

18. The information processing device according to claim 7, wherein the cache use is dynamically controlled during said program during operation.

19. The information processing device according to claim 7, wherein the cache use is controlled based on the operation mode information which is changed dynamically.

* * * * *